Patented Apr. 22, 1947

2,419,277

UNITED STATES PATENT OFFICE 2,419,277

PROCESS FOR THE PRODUCTION OF POLYAMIDE COMPOSITIONS

Robert Wighton Moncrieff, Charles William Sammons, and Edward William Wheatley, Spondon, near Derby, England, assignors to Celanese Corporation of America, a corporation of Delaware No Drawing. Application July 11, 1941, Serial No. 401,994. In Great Britain September 19, 1940.

5 Claims. (Cl. 260—33)

This invention relates to the production of artificial materials and particularly to the production of compositions having a basis of synthetic linear polymeric substances of high molecular weight suitable for the formation of artificial filaments, films and other shaped articles.

In recent years much work has been done on the production of synthetic linear polymers, for example polyamides, which have a high molecular weight and from which artificial filaments, films and other shaped articles can be produced. Among methods which may be employed for producing shaped articles from these substances is that according to which the substances are extruded or otherwise shaped while in the fused condition and are set by cooling below their melting point. In this connection reference may be made to U. S. Patents Nos. 2,303,340 and 2,323,383.

In producing shaped articles according to such methods it is important to ensure that the substances are homogeneously fused at the time of shaping, but owing to their high heat-insulating qualities this presents some difficulty. With a view to overcoming this difficulty it has been proposed to pass the substances through narrow tubes immersed in a heating medium and thence directly to the shaping device. The uniform heating of the substances, whether or not they are in a narrow tube, is rendered much easier if they are heated while in a finely divided condition.

In the production of the polymeric substances themselves by condensation of two or more bi-functional reagents with each other or of one bi-functional reagent with itself, the substances are normally first obtained in the fused condition in admixture with certain by-products or solvents. This and other considerations frequently make it impracticable to employ the fused reaction mixture directly in a shaping operation. If, however, the reaction mass is allowed to solidify, great difficulty may be met in powdering it preparatory to remelting.

Reference has been made above more particularly to shaping operations in which the polymeric substances themselves constitute substantially the whole of the composition to be shaped. As indicated in U. S. Patent No. 2,318,679, it is frequently desirable to employ compositions comprising both a film- or fibre-forming polymeric substance and an agent which in association with the substance yields a composition of relatively low melting point. Reference has been made in the said patents to the difficulties which may be encountered in producing such compositions, and certain methods by which these difficulties may be met have been mentioned. We have now further found that the phenols, sulphonamides, aliphatic acids and other organic compounds mentioned in the above patents as agents which are suitable for producing relatively low-melting compositions may be incorporated with the polymeric substances simultaneously with the precipitation of the latter, the agent to be incorporated with the polymers being present dissolved or dispersed in the precipitating medium employed. Moreover, the agents may be incorporated in the polymeric substances by immersing the solid polymers in a solution or dispersion of the desired agent in water, acetone, alcohol or other non-solvent for the polymers.

The concentration of the agent in the treatment medium, whether employed as precipitating medium or otherwise, will of course depend upon the proportion of agent which it is desired to incorporate with the polymeric substance. This proportion may be, for example, 10–20% by weight and in general does not exceed 50% by weight. For example, compositions containing about 90% of a polyamide and 10% of a phenol or 70% of a polyamide and 30% of a phenol may be produced by precipitating the polymer in an acetone-water solution of the phenol. The compositions may be separated from the liquid prespositions, thoroughly washed with a liquid medium which is substantially without solvent action on the polymer and on the phenol or other substance present, for example water or an aqueous solution, and then dried. Alternatively, a granulated polyamide, produced by precipitation from solution with 50% aqueous acetone or by other means, may be immersed in a large volume of acetone containing the appropriate amount of phenol to give the desired proportion in the polyamide. After immersion for a period sufficient to give uniform impregnation, e. g. up to 2–3 or 5 days or more, excess liquid is removed and adhering acetone evaporated by gently heating the solid. The impregnated materials may then be employed for the production of filaments or other shaped articles.

While reference has been made above to polyamides as examples of the linear polymeric substances to which the present invention may be applied, it is to be understood that the invention is not limited to these particular substances.

The following example illustrates the invention:

*Example*

50 parts by weight of hexamethylene diammonium adipate and 60 parts by weight of redistilled xylenol are heated at 218° C. for 8 hours under an atmosphere of oxygen-free nitrogen. The mixture is allowed to cool and is then broken up and dissolved in 85% formic acid. The resulting solution is poured into about 10 times its volume of a liquid consisting of 50 parts by volume of acetone, 50 parts by volume of water and 5 parts by weight of phenol. The precipitated material is left in the precipitating medium for several hours and then filtered off and washed twice with water. The residual composition may be employed in a filament-forming operation.

Having described our invention, what we desire to secure by Letters Patent is:

1. Process for the production of polyamide compositions suitable for conversion into films, filaments and other articles by shaping while in the molten state, which comprises precipitating a synthetic film-forming polyamide in finely divided condition from solution by the action of a liquid non-solvent medium therefor containing an agent which, in association with the polyamide, yields a composition of low melting point relative to the polyamide itself, and leaving the finely divided precipitated polyamide in contact with the said non-solvent medium for a time sufficient to effect uniform impregnation of the polyamide by the agent to a degree sufficient to lower substantially the melting point of the polyamide.

2. Process for the production of polyamide compositions, suitable for conversion into film, filaments and other articles by shaping while in the molten state, which comprises precipitating a synthetic film-forming polyamide in finely divided condition from solution by the action of a liquid non-solvent medium therefor containing a phenol, and leaving the finely divided precipitated polyamide in contact with the said non-solvent medium for a time sufficient to effect uniform impregnation of the polyamide by the phenol to a degree sufficient to lower substantially the melting point of the polyamide.

3. Process for the production of polyamide compositions suitable for conversion into films, filaments and other articles by shaping while in the molten state, which comprises precipitating a synthetic film-forming polyamide in finely divided condition from solution by the action of a solution of phenol in aqueous acetone, and leaving the finely divided precipitated polyamide in contact with the said aqueous acetone solution for a time sufficient to effect uniform impregnation of the polyamide by the phenol to a degree sufficient to lower substantially the melting point of the polyamide.

4. Process for the production of polyamide compositions suitable for conversion into films, filaments and other articles by shaping while in the molten state, which comprises forming a solution of a synthetic film-forming polyamide at about atmospheric temperature, precipitating the polyamide in finely divided form from the solution by the action of a liquid non-solvent medium therefor containing an agent which, in association with the polyamide, yields a composition of low melting point relative to the polyamide itself, and leaving the finely divided precipitated polyamide in contact with the said non-solvent medium for a time sufficient to effect uniform impregnation of the polyamide by the agent to a degree sufficient to lower substantially the melting point of the polyamide.

5. Process for the production of polyamide compositions suitable for conversion into films, filaments and other articles by shaping while in the molten state, which comprises forming a solution of a synthetic film-forming polyamide in formic acid, precipitating the polyamide in finely divided form from this solution by the action of a liquid non-solvent medium therefor containing a phenol, and leaving the finely divided precipitated polyamide in contact with the said non-solvent medium for a time sufficient to effect uniform impregnation of the polyamide by the phenol to a degree sufficient to lower substantially the melting point of the polyamide.

ROBERT WIGHTON MONCRIEFF.
CHARLES WILLIAM SAMMONS.
EDWARD WILLIAM WHEATLEY.

REFERENCES CITED

The following references are of record in the file of this patent:

UNITED STATES PATENTS

| Number | Name | Date |
|---|---|---|
| 2,265,119 | Coolidge | Dec. 2, 1941 |
| 2,214,442 | Spanagel | Sept. 10, 1940 |
| 2,158,064 | Carothers | May 16, 1939 |
| 1,999,405 | Dreyfus | Apr. 30, 1935 |
| 2,265,303 | Moss | Dec. 9, 1941 |
| 2,265,559 | Watkins | Dec. 9, 1941 |
| 2,193,529 | Coffman | Mar. 12, 1940 |
| 2,216,835 | Carothers | Oct. 8, 1940 |